United States Patent
Lindberg et al.

(10) Patent No.: US 7,830,396 B2
(45) Date of Patent: Nov. 9, 2010

(54) CONTENT AND ACTIVITY MONITORING

(75) Inventors: Phillip John Lindberg, Helsinki (FI);
Sami Johannes Niemela, Helsinki (FI);
Christopher Michael Heathcote, London (GB)

(73) Assignee: Nokia Corporation, Espoo (FI)

( * ) Notice: Subject to any disclaimer, the term of this patent is extended or adjusted under 35 U.S.C. 154(b) by 534 days.

(21) Appl. No.: 11/770,952

(22) Filed: Jun. 29, 2007

(65) Prior Publication Data

US 2009/0002388 A1    Jan. 1, 2009

(51) Int. Cl.
*G09G 5/00* (2006.01)
*G06F 17/00* (2006.01)
*G06F 3/00* (2006.01)
*G06F 3/048* (2006.01)

(52) U.S. Cl. .................. 345/581; 345/594; 345/520; 345/619; 715/967; 715/200; 715/273; 715/700

(58) Field of Classification Search .......... 715/200, 715/273, 700, 713, 763–764, 781, 788, 810, 715/967; 345/581, 594, 636, 661, 501, 520, 345/619
See application file for complete search history.

(56) References Cited

U.S. PATENT DOCUMENTS 5,793,365 A * 8/1998 Tang et al. .................. 715/758
6,690,390 B1 * 2/2004 Walters et al. .............. 715/705

FOREIGN PATENT DOCUMENTS

WO    03/071420 A    8/2003

OTHER PUBLICATIONS

International Search Report dated May 29, 2009.

* cited by examiner

*Primary Examiner*—Wesner Sajous (57) ABSTRACT

A user interface includes at least one application element on a display of a device and at least indicative element associated with the at least one application element. The at least one indicative element is configured to vary at least one attribute in relation to a parameter of the at least one application element in order to reflect a degree of activity associated with an application linked to the at least one application element.

25 Claims, 7 Drawing Sheets

CONTENT AND ACTIVITY MONITORING

BACKGROUND

1. Field

The disclosed embodiments generally relate to user interfaces and in particular to monitoring content and application activity and convey information related to services.

2. Brief Description of Related Developments

Mobile devices, such as mobile communication devices, generally include a variety of applications, including for example Internet communications, instant messaging capabilities, email facilities, web browsing and searching. Generally, accessing the various applications and obtaining information about the content of an application or the level of activity associated with an application requires opening the application. In order to display the various types of information associated with applications, hierarchical tree models can be used to display similar information. User interfaces and displays for such communications are limited in size and the amount of information that can be presented and displayed to a user is restricted by the size of the display and the ease of manipulation of the device to move to different screens and tree levels. It would be advantageous to be able to easily view the quantity of content and the activity levels for applications of a device.

SUMMARY

In one aspect, the disclosed embodiments are directed to a method. In one embodiment the method includes providing at least one application element on a display of a device. The application element is surrounded by at least one indicative element, which can move around the application element. Attributes of the indicative elements, which can include attributes such as for example, color, opacity, shape, size and speed, can be varied to reflect many degrees of activity related to the corresponding application, client or service, and the associated content. An application element can be selected and opened to display a content of the application element.

In another aspect, the disclosed embodiments are directed to a user interface. In one embodiment the user interface comprises at least one application element on a display of a device and at least one indicative element associated with the at least one application element. The at least one indicative element is configured to move in relation to the at least one application element and the at least one indicative element is configured to vary at least one attribute associated with at least one indicative element in order to reflect a degree of activity associated with the application, service or content linked to the at least one application element.

In yet another aspect the disclosed embodiments are directed to an apparatus. In one embodiment, the apparatus includes a controller; a display interface coupled to the controller; and an input device coupled to the controller. In one embodiment, the controller further includes at least one processor. The at least one processor can be configured to provide at least one central element linked to a core application or service of the apparatus; provide at least one sub-element linked to the at least one central element, the at least one sub-element being linked to an application or service of the core application; provide at least one indicative element related to the at least one sub-element, the at least one indicative element being related to a parameter of the application or service linked to the at least one sub-element; wherein the processor is further configured to vary at least one attribute of the at least one indicative element in dependence on activity related to the parameter of the application or service linked to the at least one sub-element.

In a further aspect the disclosed embodiments are directed to a system. In one embodiment, the system includes means for providing at least one central element linked to a core application or service of the apparatus; means for providing at least one sub-element linked to the at least one central element, the at least one sub-element being linked to an application or service of the core application; means for providing at least one indicative element related to the at least one sub-element, the at least one indicative element being related to a parameter of the application or service linked to the at least one sub-element; and means for varying at least one attribute of the at least one indicative element in dependence on activity related to the parameter of the application or service linked to the at least one sub-element.

In yet a further aspect the disclosed embodiments are directed to a computer program product. In one embodiment, the computer program product comprises a computer useable medium having computer readable code means embodied therein for causing a computer to execute a set of instructions in a device to provide a user interface for a device. The computer readable code means in the computer program product includes computer readable program code means for causing a computer to provide at least one application element on a display of a device and at least one indicative element. The computer readable program code means is configured to cause the computer to vary at least one attribute of the indicative element in relation to a degree of activity associated with the application, service or content linked to the application element.

BRIEF DESCRIPTION OF THE DRAWINGS

The foregoing aspects and other features of the embodiments are explained in the following description, taken in connection with the accompanying drawings, wherein.

DETAILED DESCRIPTION OF THE EMBODIMENT(S)

Figure 1:
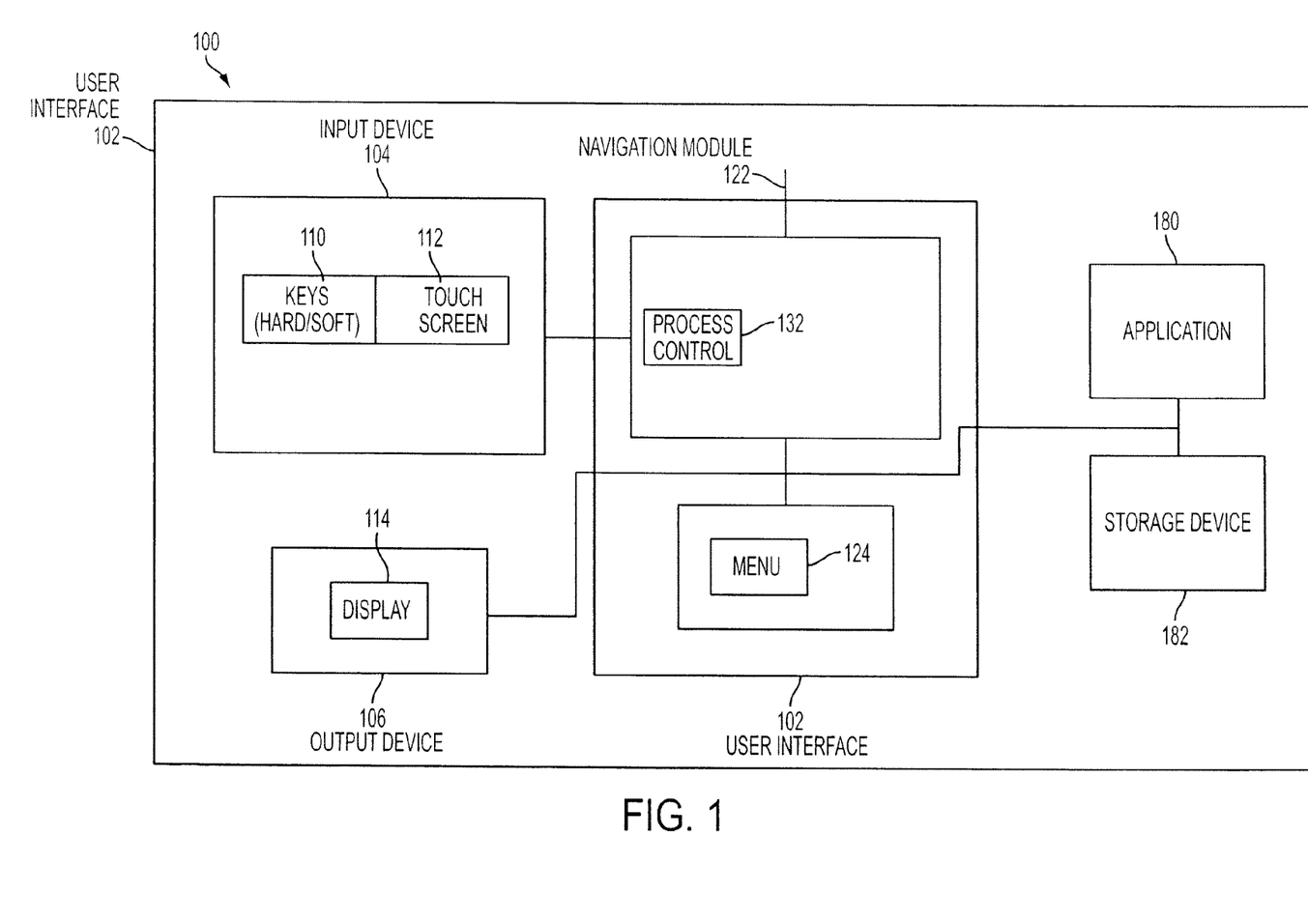
FIG. 1 shows a block diagram of a system in which aspects of the disclosed embodiments may be applied.

Referring to FIG. 1, one embodiment of a system 100 is illustrated that can be used to practice aspects of the claimed invention. Although aspects of the claimed invention will be described with reference to the embodiments shown in the drawings and described below, it should be understood that these aspects could be embodied in many alternate forms of embodiments. In addition, any suitable size, shape or type of elements or materials could be used.

The disclosed embodiments generally allow a user of a device or system, such as the system 100 shown in FIG. 1 to quickly and easily obtain and view information related to the applications, services, or clients. This can include for example, the quantity of application content and the activity level associated with various functions or applications active or available in a device. The disclosed embodiments convey information related to services that are generally server-side. The system 100 of FIG. 1 allows the visualization of an application, client or service, or some combination thereof. In a device that has for example, people and places types of applications, the user interface of the disclosed embodiments allows many aspects of the applications to be visible at a glance and parameters such as the areas of activity and interest can be monitored easily. Indicative elements can be used in conjunction with visualizations of parameters, services and applications to demonstrate the quantity of content and relative degree of activity associated with the various services and applications. The embodiments disclosed herein provide high level monitoring capabilities with each of interaction of the underlying application, client or service.

In one embodiment, referring to FIG. 1, the system 100 of FIG. 1 can include an input device 104, output device 106, navigation module 122, applications area 180 and storage/memory device 182. The components described herein are merely exemplary and are not intended to encompass all components that can be included in a system 100 of the disclosed embodiments. For example, in one embodiment, the system 100 comprises a mobile communication device or other such internet and application enabled devices. Thus, in alternate embodiments, the system 100 can include other suitable devices and applications for monitoring application content and activity levels of services, applications and clients in such a device. While the input device 104 and output device 106 are shown as separate devices, in one embodiment, the input device 104 and output device 106 can be part of, and form, the user interface 102. The user interface 102 can be used to display application and element information to the user, and allow the user to obtain application content and application activity data. In one embodiment, the user interface of the disclosed embodiments can be implemented on or in a device that includes a touch screen display or a proximity screen device. The aspects of the disclosed embodiments are not limited to single-touch or contact devices. In one embodiment, the aspects of the disclosed embodiments can be incorporated in and practiced on multi-touch device. In alternate embodiments, the aspects of the user interface disclosed herein can be embodied on any suitable device that will display information and allow the selection and activation of applications.

Figure 2A:
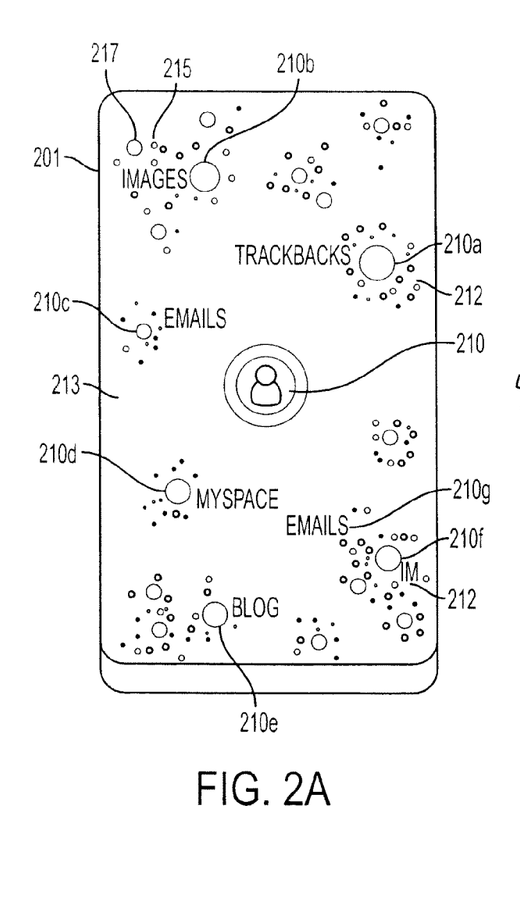
FIGS. 2A-2B are illustrations of exemplary screen shots of the user interface of the disclosed embodiments.

FIG. 2A illustrates one embodiment of a screen shot of a user interface 201 incorporating features of the disclosed embodiments. As shown in FIG. 2A, elements 210a-210g are representative of, or are links to applications and/or services, utilities associated with a personal network application 210. The elements 210a-210g are displayed on the user interface 201 in some relation to the corresponding main element 210. Icons or other graphic images can be used to or represent the elements 210a-210g. The icons should be capable of being selectable, such as an object, in order to activate or interact with the corresponding application, service or client that a respective element 210a-210g is linked to. Examples of these applications, services and clients can include for example, but are not limited to, Trackbacks 210a, Images 210b, Emails 210c, MySpace 210d, Blog 210e, Instant messaging 210f and emails 210g. Each of the elements 210a-210g generally represents a link to an application, service, utility, content or forum that are related to the main or central application, designated in this example as 210. In alternate embodiments the elements or icons can include links to any suitable application, service, utility, content or forum, which will generally be described herein for ease of discussion as "applications".

The "applications" related or linked to the pods 210 and elements 212 are not limited to applications, clients or services. For example, in one embodiment, the application 210 could comprise a web application or website. Each of the elements, which are not limited to any particular number, could then relate to applications that use, interact with, service or cooperate with the website. In another embodiment, the pod 210 represents a blog. The elements 212 can represent people who have posted entries or replies in the blog and trackbacks people who have posted replies to the blog. Another example is a service that has different indicators for different types of associated activity. Referring to FIG. 2A, a service, such as for example a image sharing/storing service, is represented by the element or object 210b. One indicator 215 can represent a number of people viewing my images and can be distinguished by a color, say blue. Another indicator 217 could represent the number of people commenting on my images. The indicator 217 might be a different color, say red. Although color is described here as being the distinguishing indicator, in alternate embodiments, any suitable distinguishing characteristic can be used, other than including color.

In one embodiment the elements 210a-210g, which can be any desired image, shape, color, or size, can be referred to as "pods". Any attribute of the elements 210a-210g can be varied to reflect a parameter of the related application. For example, the size of the pods can be used to reflect a relative degree of activity associated with the underlying element application. Although the term "size" is used here in relation with the different elements or pods, in one embodiment, a pod having an application with more underlying or associated activity may appear "closer" to the outer surface of the display region of the user interface 201. The closer image may appear to be larger as compared to the distant image. For example, as shown in FIG. 2A, the trackbacks element 210a appears "larger" or closer to the user relative to the display, than does the emails element 210c. This variation in size or relative position can be indicative of a variation or difference in the relative degrees of activity or quantity of content associated with each. In one embodiment, the relationship or association of an element 210a-210g to the central or main application 210 can be illustrated by a line or connection link 213 extending from the main application 210 to an element, such as element 210d. In alternate embodiments, any suitable indicator can be used to illustrate a connection between the main application and an element 210a-210g.

As illustrated in FIG. 2A, surrounding each of the elements 210a-210g are one or more smaller elements 212, which can be referred to as "sub-categories" or "sub-elements" of or to the main or central element 210. The smaller elements 212 can generally represent "sub-categories" of the main elements 210, which can be described or represent "categories". The relationship between the pods 210 and elements 212 might also be described as "element" and "sub-element", or "layer" and "sub-layer". In alternate embodiments, any suitable number of levels or layers of categories or elements can be used. Thus, a sub-element could also have other sub-elements in relation thereto. In one embodiment, the elements 210a-210g can represent services and applications, while the smaller elements 212 represent parameters of these services and applications.

The number of elements 212 associated with or surrounding any one of the pods 210a-210g generally reflects the relative degree of activity associated with a corresponding pod. This allows a user to quickly glance at the user interface 201 and get a sense of, for example, the level of content or activity related to a particular application, without having to change screens or open application. In one embodiment, the user can specify or program which particular attributes or parameters to monitor. For example, trackbacks pod 210*a* has a larger number of elements associated with it than does the images pod 210*b*. This indicates that there is generally greater relative degree of activity associated with the trackbacks application 210*a*, than, for example, the images application 210*b*, at that particular point in time. The time frames or references can be based on any particular reference points.

In one embodiment, as shown in FIG. 2A, the size, shape, dimensions and other attributes of each of the elements 212 can vary with respect to one another. The attributes can include for example, in addition to those described above, quantity, size, color and movement. The quantity of indicative elements 212 can suggest the amount of new associated content. This can include for example, new pictures, new blog postings, and comments. The size of a pod can be used to reflect a particular channel or service and can also be used to suggest foregrounding/back grounding. In one embodiment, the preferred channel can be located in a "front" area of the device. Color can also be used to provide a visual cue at to the aspects of the underlying application. For example, a visual cue can be used for branding or channel recognition on the pod, and for classification in the indicative elements 212. In one embodiment, a red color of the indicative elements might reflect "family", blue could correspond to "friend" and green corresponding to "other". In alternate embodiments, and suitable color structure or mixture thereof can be used.

In one embodiment, there can be a varying mixture of elements 212 in a particular grouping. There does not need to be any set size or dimension for elements 212. In this example, there are illustrated as somewhat smaller in size than the pod they are associated with, but vary in size relative to each other. The relative size of the elements 212 can also be used and adjusted to reflect the quantity of content and degree of activity levels associated with a particular pod.

In another embodiment, the pods 210*a*-210*g* can appear as a nucleus for the elements or "electrons" 212 that move around and about the nucleus. The speed of movement or rotation of the elements 212 around the pods 210*a*-210*g* can also be used to reflect the relative degree of activity and quantity of content associated with a respective application represented by pod 210*a*-210*g*.

As text label can be associated with each of the elements 210*a*-210*g*. In one embodiment, the textual label can appear attached to the corresponding element 210*a*-210*g*, and scale itself to a relative size of the corresponding element. In alternate embodiments, the format of the text label can be varied in conjunction with the degree of activity and quantity of content. For example, an application with a relatively greater degree of activity and/or content might appear larger in size, or highlighted in some way (bold, italics, underlined, for example), relative to another application. In one embodiment, while a pod 210*a*-210*g* and/or the elements 212 associated therewith can move in any fashion, the text label can remain in a fixed, horizontal orientation, relative to the viewing area of the display of the corresponding device.

Figure 2B:
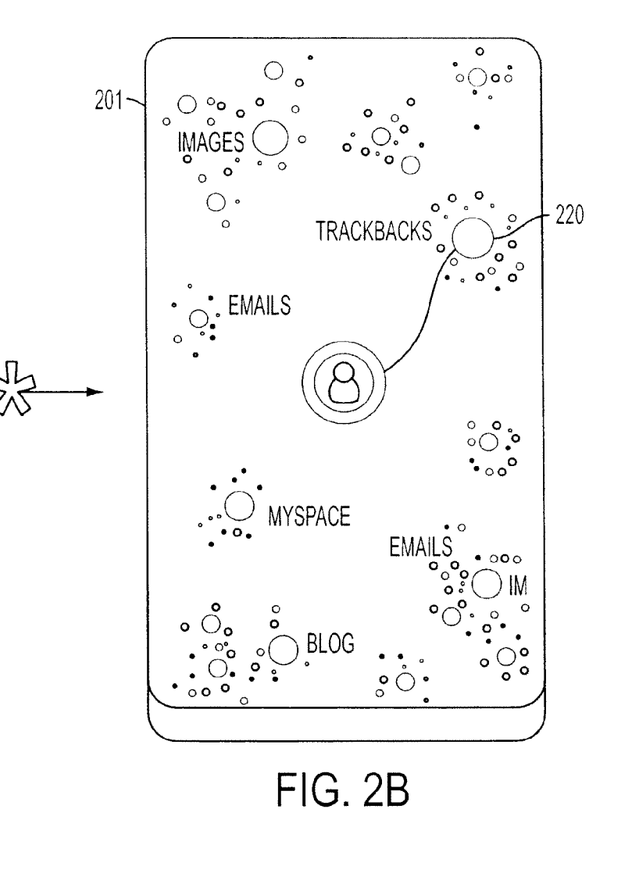
Figure 3A:
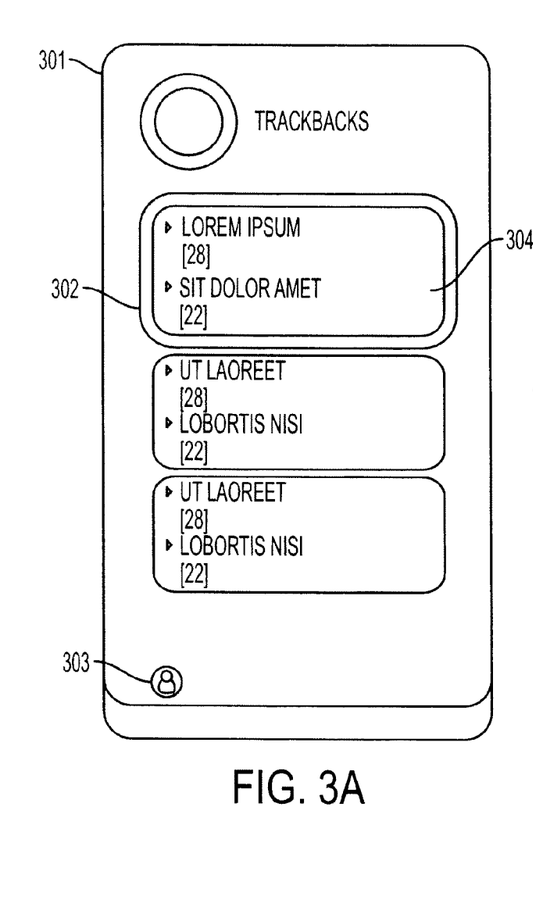
FIGS. 3A and 3B are illustrations of exemplary screen shots of the user interface of the disclosed embodiments.

Each of the elements 210*a*-210*g* can be selected and activated in order to open and access the features of the underlying application. For example, referring to FIG. 2B, the trackbacks element 210*a* of FIG. 2A has been selected. As shown in FIG. 2B, once selected, the icon 220 representing the trackbacks element expands to indicate its selection. In alternate embodiments, any suitable manner of highlighting a selected application can be used. In this example, where the user interface 201 is a touch screen display, the user contacts the desired application in order to select it, by for example, touching the icon on the screen. The selected icon can expand at that point, or appear closer to the user, and then be moved or dragged slightly in a direction to confirm its selection. Once selected, the underlying application can open. For example, with the touch screen display, once the user lifts their finger off the screen, the application can open, as illustrated in FIG. 3A. In alternate embodiments, any suitable method for selecting an icon and activating or opening the underlying application can be used.

FIG. 3A illustrates a screen shot of an opened application in one aspect of the disclosed embodiments. Here, the trackbacks application 210*a* of FIG. 2A has been opened and aspects of the opened application are displayed on the user interface 310. The contents 302 are displayed in a clear and concise manner. The contents related to each pod 210*a*-210*g* of FIG. 2A can be context-relative and can include detailed information related to the channel, such as for example, statistical information and other data. In one embodiment, a link 303 can be provided to allow the user to revert back to the screen illustrated in FIG. 2A. In alternate embodiments, any suitable mechanism can be used to allow the user to return back to the functions and screen illustrated with respect to FIG. 2A.

Figure 3B:
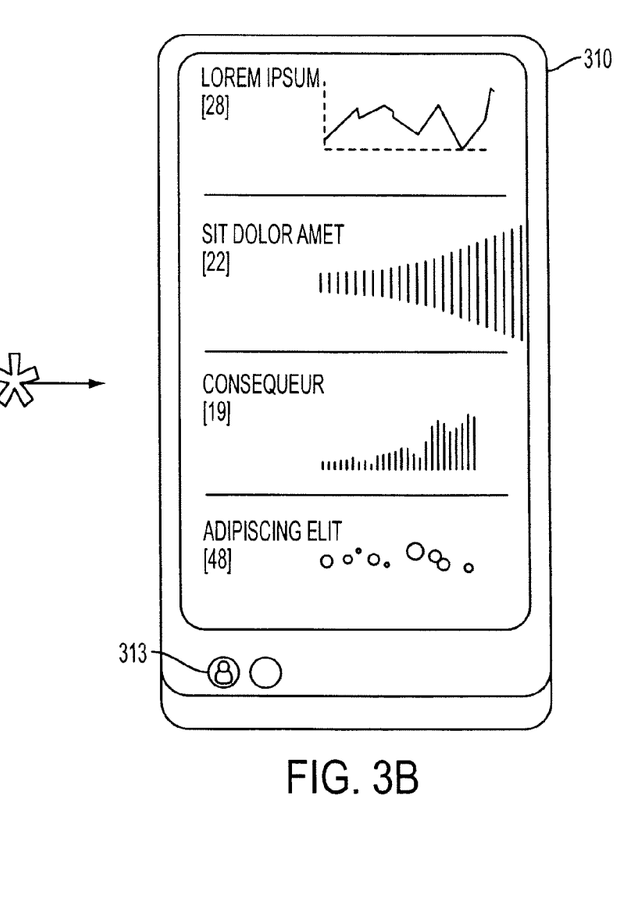

The selection of anyone of the activable content area, such as content 304, can allow the user to view the details of activity with respect to the particular channel. As shown in FIG. 3B, the display 310 is presenting more detailed information related to the channel, such as for example, statistical parameters. The higher fidelity of information can include any suitable information, and can be statistical, or include previews of the actual content, such as comments, images and animations. This can function as an entry point for a service and the content with. As shown in FIG. 3B, a link 313 can be provided that allows the user to return or go back to a previous screen or application.

The aspects of the disclosed embodiments can be implemented on any device that includes a user interface for the display and accessing of information, such as the system 100 shown in FIG. 1. In one embodiment, the input device 104 includes a touch screen display 112 on which the pods 210*a*-210*g* and indicative elements 212 can be displayed. The inputs and commands from a user, such as the touching of the screen, are received in the input module 104 and passed to the navigation module 122 for processing. The output device 106, which in one embodiment is implemented in the touch screen display 112, can receive data from the user interface 102, application 180 and storage device 182 for output to the user. The pod and indicative elements attributes can be processed in the navigation module 122 and passed to the output device 106 for display to the user.

Each of the input device 104 and output device 106 are configured to receive data or signals in any format, configure the data or signals to a format compatible with the application or device 100, and then output the configured data or signals. While a display 114 is shown as part of the output device 106, in other embodiments, the output device 106 could also include other components and device that transmit or present information to a user, including for example audio devices and tactile devices.

The user input device 104 can include controls that allow the user to interact with and input information and commands to the device 100. For example, with respect to the embodiments described herein, the user interface 102 can comprise a touch screen display where contact with the display provides the inputs and signals. With a proximity screen device, the proximity of the pointing device provides the input. The output device 106 can be configured to provide the content of the exemplary screen shots shown herein, which are presented to the user via the functionality of the display 114. Where a touch screen device is used, the displays 112 and 114 can comprise the same or parts of the same display. User inputs to the touch screen display are processed by, for example, the touch screen input control 112 of the input device 104. The input device 104 can also be configured to process new content and communications to the system 100. The navigation module 122 can provide controls and menu selections, and process commands and requests. Application and content objects can be provided by the menu control system 124. The process control system 132 can receive and interpret commands and other inputs, interface with the application module 180, storage device 180 and serve content as required. Thus, the user interface 102 of the embodiments described herein, can include aspects of the input device 104 and output device 106.

Figure 4A:
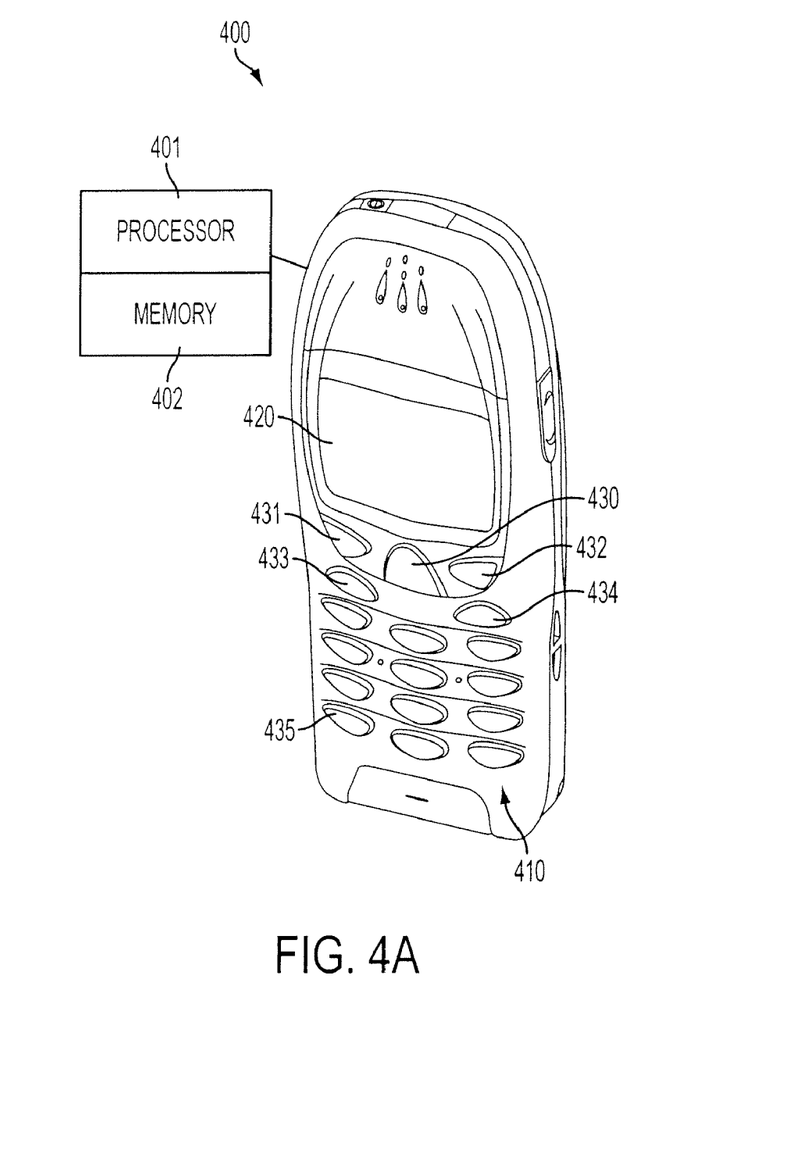
FIGS. 4A-4B are illustrations of examples of devices that can be used to practice aspects of the disclosed embodiments.
Figure 4B:
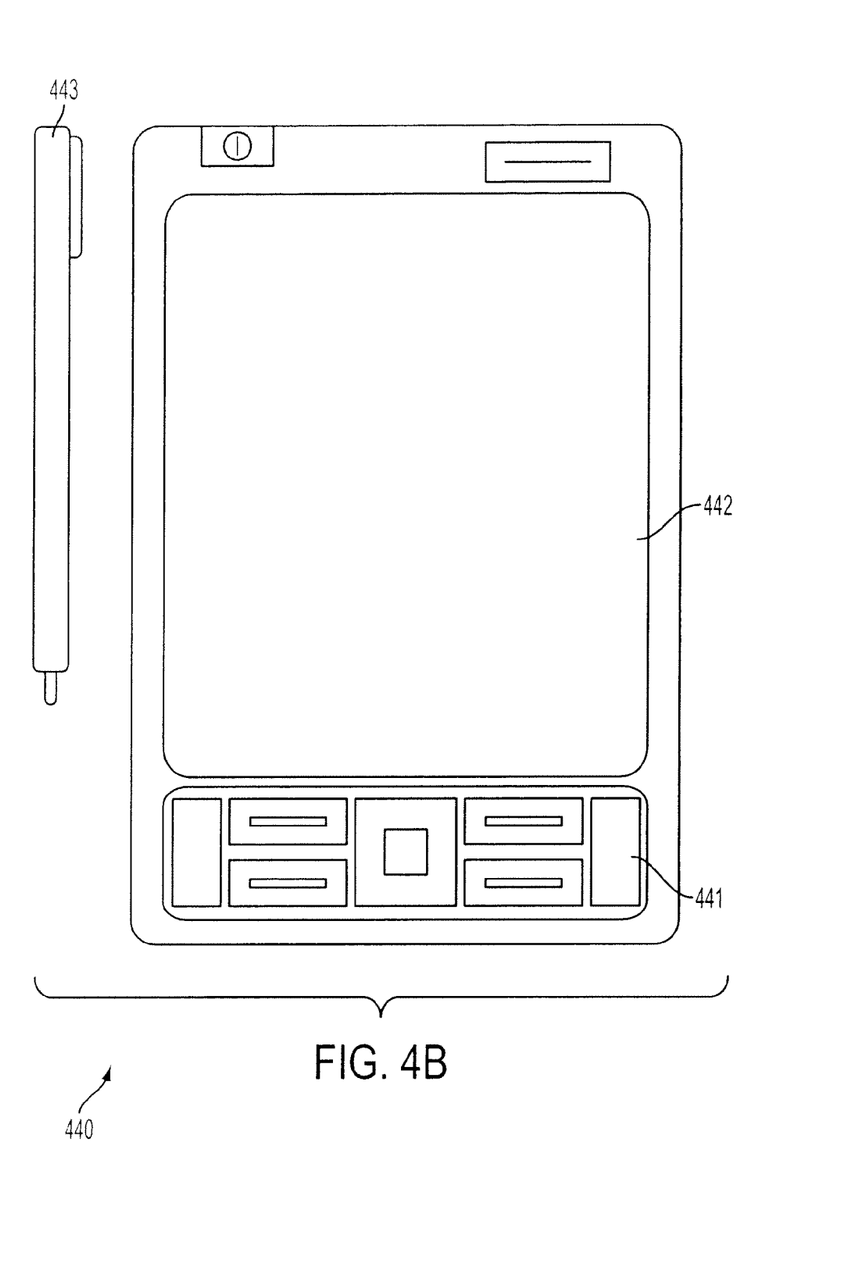

Examples of devices on which aspects of the disclosed embodiments can be practiced are illustrated with respect to FIGS. 4A and 4B. The terminal or mobile communications device 400 may have a keypad 410 and a display 420. The keypad 410 may include any suitable user input devices such as, for example, a multi-function/scroll key 430, soft keys 431, 432, a call key 433, an end call key 434 and alphanumeric keys 435. The display 420 may be any suitable display, such as for example, a touch screen display or graphical user interface. The display may be integral to the device 400 or the display may be a peripheral display connected to the device 400. A pointing device, such as for example, a stylus, pen or simply the user's finger may be used with the display 420. In alternate embodiments any suitable pointing device may be used. In other alternate embodiments, the display may be a conventional display. The device 400 may also include other suitable features such as, for example, a camera, loud speaker, connectivity port or tactile feedback features. The mobile communications device may have a processor 401 connected to the display for processing user inputs and displaying information on the display 420. A memory 402 may be connected to the processor 401 for storing any suitable information and/or applications associated with the mobile communications device 400 such as phone book entries, calendar entries, etc.

Figure 6:
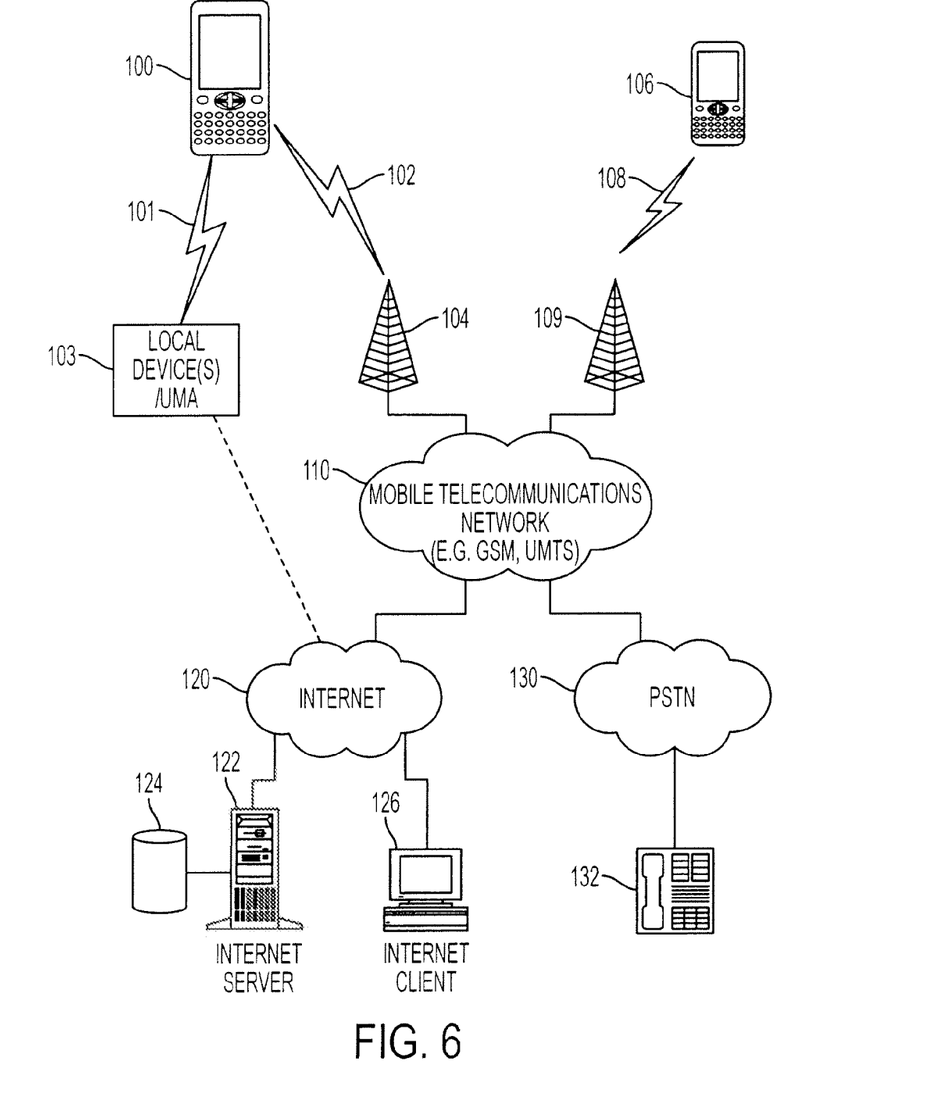
FIG. 6 is a block diagram illustrating the general architecture of the exemplary local system of FIGS. 4A-4B.

In the embodiment where the device 400 comprises a mobile communications device, the device can be adapted to communication in a telecommunication system, such as that shown in FIG. 6. In such a system, various telecommunications services such as cellular voice calls, www/wap browsing, cellular video calls, data calls, facsimile transmissions, music transmissions, still image transmission, video transmissions, electronic message transmissions and electronic commerce may be performed between the mobile terminal 600 and other devices, such as another mobile terminal 606, a line telephone 632, a personal computer 651 or an internet server 622. It is to be noted that for different embodiments of the mobile terminal 600 and in different situations, some of the telecommunications services indicated above may or may not be available. The aspects of the disclosed embodiments are not limited to any particular set of services in this respect.

The mobile terminals 600, 606 may be connected to a mobile telecommunications network 610 through radio frequency (RF) links 602, 608 via base stations 604, 609. The mobile telecommunications network 610 may be in compliance with any commercially available mobile telecommunications standard such as for example GSM, UMTS, D-AMPS, CDMA2000, (W)CDMA, WLAN, FOMA and TD-SCDMA.

The mobile telecommunications network 610 may be operatively connected to a wide area network 620, which may be the internet or a part thereof. An internet server 622 has data storage 624 and is connected to the wide area network 620, as is an internet client computer 626. The server 622 may host a www/wap server capable of serving www/wap content to the mobile terminal 600.

A public switched telephone network (PSTN) 630 may be connected to the mobile telecommunications network 610 in a familiar manner. Various telephone terminals, including the stationary telephone 632, may be connected to the PSTN 630.

The mobile terminal 600 is also capable of communicating locally via a local link 601 or 651 to one or more local devices 603 or 650. The local links 601 or 651 may be any suitable type of link with a limited range, such as for example Bluetooth, a Universal Serial Bus (USB) link, a wireless Universal Serial Bus (WUSB) link, an IEEE 802.11 wireless local area network (WLAN) link, an RS-232 serial link, etc. The local devices 603 can, for example, be various sensors that can communicate measurement values to the mobile terminal 600 over the local link 601. The above examples are not intended to be limiting, and any suitable type of link may be utilized. The local devices 603 may be antennas and supporting equipment forming a WLAN implementing Worldwide Interoperability for Microwave Access (WiMAX, IEEE 802.16), WiFi (IEEE 802.11x) or other communication protocols. The WLAN may be connected to the internet. The mobile terminal 600 may thus have multi-radio capability for connecting wirelessly using mobile communications network 610, WLAN or both. Communication with the mobile telecommunications network 610 may also be implemented using WiFi, WiMax, or any other suitable protocols, and such communication may utilize unlicensed portions of the radio spectrum (e.g. unlicensed mobile access (UMA)). In one embodiment, the navigation module 122 of FIG. 1 can include a communications module that is configured to interact with the system described with respect to FIG. 6.

In one embodiment, the system 100 of FIG. 1 may be for example, a PDA style device 440 illustrated in FIG. 4B. The PDA 440 may have a keypad 441, a touch screen display 442 and a pointing device 443 for use on the touch screen display 442. In still other alternate embodiments, the device may be a personal communicator, a tablet computer, touch pad, Internet tablet, a laptop or desktop computer, a television or television set top box, or any other suitable device capable of containing the display 442 and supported electronics such as a processor and memory. The exemplary embodiments herein are described with reference to the mobile communications device 400 for exemplary purposes only and it should be understood that the embodiments could be applied equally to any suitable device incorporating a display, processor, memory and supporting software or hardware.

The user interface 102 of FIG. 1 can also include a menu system 124 in the navigation module 122. The navigation module 122 provides for the control of certain processes of the device 100. The menu system 124 can provide for the selection of different tools, services and application options related to the applications or programs running on the device 100. In the embodiments disclosed herein, the navigation module 122 receives certain inputs, such as for example, signals, transmissions, instructions or commands related to the functions of the device 100. Depending on the inputs, the navigation module interprets the commands and directs the process control 132 to execute the commands accordingly.

Activating a control generally includes any suitable manner of selecting or activating a function associated with the device, including touching, pressing or moving the input device. In one embodiment, where the input device 104 comprises control 110, which in one embodiment can comprise a device having a keypad, pressing a key can activate a function. Alternatively, where the control 110 of input device 104 also includes a multifunction rocker style switch, the switch can be used to select a menu item and/or select or activate a function. When the input device 104 includes control 112, which in one embodiment can comprise a touch screen pad, user contact with the touch screen will provide the necessary input. Voice commands and other touch sensitive input devices can also be used.

Referring to FIG. 1, the display 114 of the device 100 can comprise any suitable display, such as noted earlier, a touch screen display or graphical user interface. In one embodiment, the display 114 can be integral to the device 100. In alternate embodiments the display may be a peripheral display connected or coupled to the device 100. A pointing device, such as for example, a stylus, pen or simply the user's finger may be used with the display 114. In alternate embodiments any suitable pointing device may be used. In other alternate embodiments, the display may be any suitable display, such as for example a flat display 114 that is typically made of an LCD with optional back lighting, such as a TFT matrix capable of displaying color images. A touch screen may be used instead of a conventional LCD display.

The device 100 may also include other suitable features such as, for example, a camera, loudspeaker, connectivity port or tactile feedback features.

Figure 5:
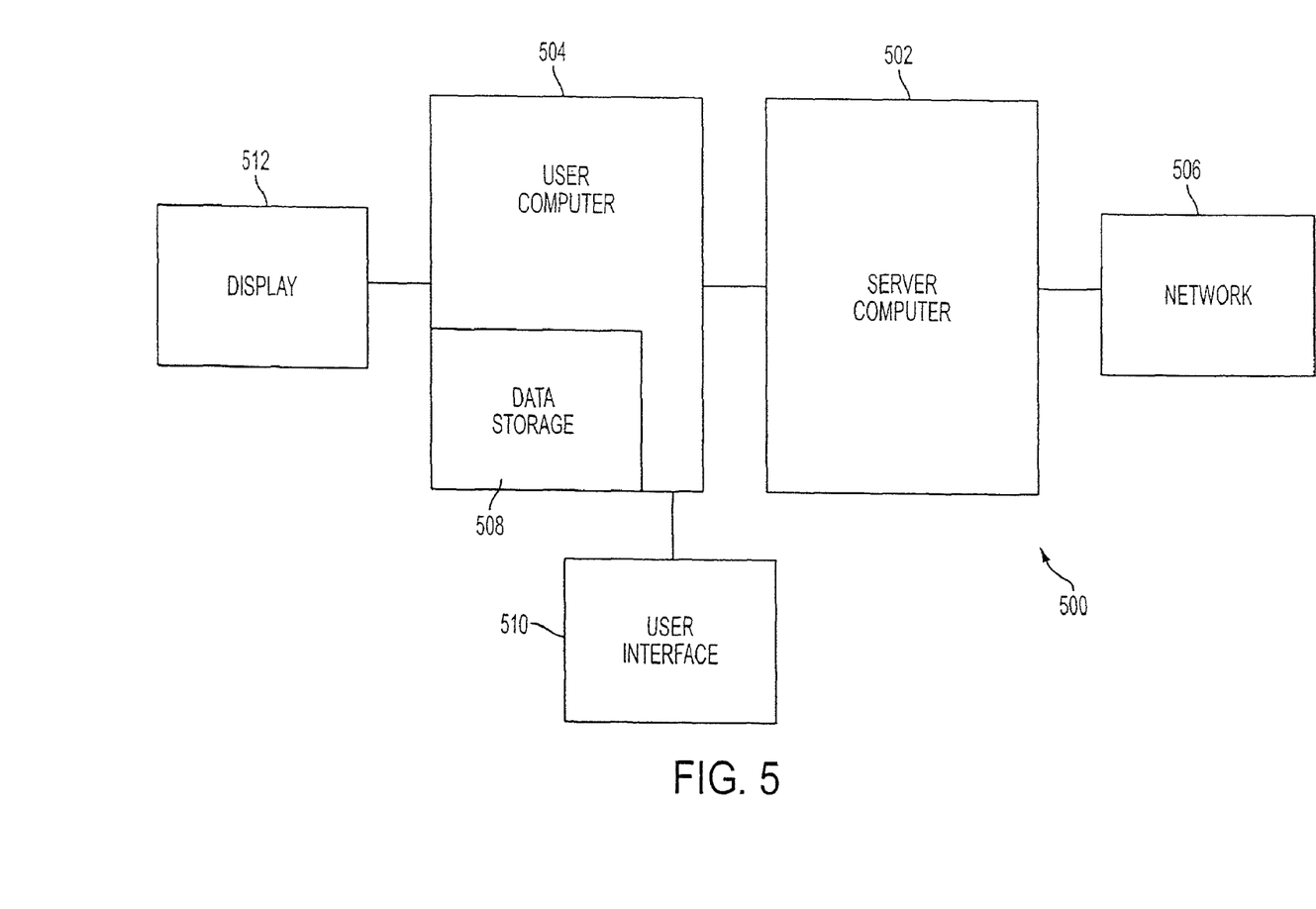
FIG. 5 illustrates a block diagram of an exemplary apparatus incorporating features that may be used to practice aspects of the disclosed embodiments.

The disclosed embodiments may also include software and computer programs incorporating the process steps and instructions described above that are executed in different computers. FIG. 5 is a block diagram of one embodiment of a typical apparatus 500 incorporating features that may be used to practice aspects of the invention. The apparatus 500 can include computer readable program code means for carrying out and executing the process steps described herein. As shown, a computer system 502 may be linked to another computer system 504, such that the computers 502 and 504 are capable of sending information to each other and receiving information from each other. In one embodiment, computer system 502 could include a server computer adapted to communicate with a network 506. Computer systems 502 and 504 can be linked together in any conventional manner including, for example, a modem, wireless, hard wire connection, or fiber optic link. Generally, information can be made available to both computer systems 502 and 504 using a communication protocol typically sent over a communication channel or through a dial-up connection on ISDN line. Computers 502 and 504 are generally adapted to utilize program storage devices embodying machine-readable program source code, which is adapted to cause the computers 502 and 504 to perform the method steps, disclosed herein. The program storage devices incorporating aspects of the invention may be devised, made and used as a component of a machine utilizing optics, magnetic properties and/or electronics to perform the procedures and methods disclosed herein. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 502 and 504 may also include a microprocessor for executing stored programs. Computer 502 may include a data storage device 508 on its program storage device for the storage of information and data. The computer program or software incorporating the processes and method steps incorporating aspects of the invention may be stored in one or more computers 502 and 504 on an otherwise conventional program storage device. In one embodiment, computers 502 and 504 may include a user interface 510, and a display interface 512 from which aspects of the invention can be accessed. The user interface 510 and the display interface 512 can be adapted to allow the input of queries and commands to the system, as well as present the results of the commands and queries.

The disclosed embodiments generally provide for a user to be able to have fast and easy access to information related to services, applications and clients in a device. The user interface of the disclosed embodiments allow aspects of the people and places applications, for example, to be visible at a glance. The levels of activity associated with specific aspects of an application can be easily monitored without the need to open an application or application aspect. Indicative elements can be used in conjunction with visualizations of services and applications to demonstrate the quantity of content and relative degree of activity associated with the various services and applications. This provides the advantage of high level monitoring capability with each of interaction of the underlying application or service.

It should be understood that the foregoing description is only illustrative of the embodiments. Various alternatives and modifications can be devised by those skilled in the art without departing from the embodiments. Accordingly, the disclosed embodiments are intended to embrace all such alternatives, modifications and variances that fall within the scope of the appended claims.

What is claimed is:

1. A method comprising:
providing at least one application element on a display of a device, the at least one application element being related to at least one indicative element on the display, the indicative element being located adjacent the at least one application element on the display and configured to represent at least one parameter of the at least one application element;
varying at least one attribute of the indicative element in dependence upon activity related to the at least one parameter; and
selecting an application element to open and display a content of an application associated with the application element.

2. The method of claim 1 further comprising providing a plurality of indicative elements in near proximity to the at least one application element, the number of indicative elements corresponding to a relative degree of activity associated with the application associated with the at least one application element.

3. The method of claim 1 further comprising moving the indicative element around the at least one application element a rate of speed that is related to a level of activity associated with the application associated with the at least one application element.

4. The method of claim 1 further comprising configuring the at least one indicative element to correspond to a level of activity associated with the at least one application element since a last time a user accessed the application associated with the at least one application element.

5. The method of claim 1 further comprising configuring an application element related to an application with more associated activity to appear larger and closer to a top surface of the display than an application element related to an application with less activity.

6. The method of claim 1 further comprising associating a textual reference to each application element.

7. The method of claim 1 wherein selecting the application element further comprises highlighting and expanding the application element to appear closer to an upper surface area of the display.

8. The method of claim 1 wherein the application element is associated with a communication application and the at least one indicative element corresponds to user activity related to the communication application.

9. The method of claim 1 further comprising configuring the at least one indicative element to vary at least one attribute of the indicative element relative to a level of activity with respect to the application associated with the application element, wherein the at least one attribute comprises quantity, size, color or movement.

10. The method of claim 1 further comprising providing an indicative element for each content item associated with the application corresponding to the application element.

11. The method of claim 1 wherein the application comprises services, clients or content.

12. A user interface comprising:
a link to a central application;
at least one application element, the at least one application element being linked to the central application and is a sub-application, client or service of the central application; and
at least one indicative element associated with the at least one application element, the at least one indicative element being located adjacent the at least one application element and configured to vary at least one attribute in relation to a variation in a parameter of the at least one application element.

13. The user interface of claim 12 further comprising a plurality of indicative elements in proximity to a respective application element, the plurality of indicative elements configured to move around the respective application element in correspondence with a monitored parameter of the respective application element.

14. The user interface of claim 13 wherein the monitored parameter comprises a level of user activity with respect to the respective application element.

15. An apparatus comprising:
a controller;
a display interface coupled to the controller; and
an input device coupled to the controller, wherein the controller further comprises at least one processor, the at least one processor being configured to:
provide at least one central element linked to a core application or service of the apparatus;
provide at least one sub-element linked to the at least one central element, the at least one sub-element being linked to an application or service of the core application;
provide at least one indicative element related to the at least one sub-element, the at least one indicative element being located adjacent the at least one sub-element on the display and related to a parameter of the application or service linked to the at least one sub-element;
wherein the processor is further configured to vary at least one attribute of the at least one indicative element in dependence on activity related to the parameter of the application or service linked to the at least one sub-element.

16. The apparatus of claim 15 further comprising the processor being configured to open and display information related to the at least one sub-element when the at least one sub-element is selected.

17. The apparatus of claim 15 wherein the at least one attribute of the at least one indicative element is shape, size, color, image or speed.

18. The apparatus of claim 15 wherein the parameter of the application or service linked to the sub-element is an application, service or client.

19. The apparatus of claim 15 wherein the processor is further configured to vary a rotational speed of the at least one indicative element around the at least one sub-element corresponding to a level of activity associated with the at least one sub-element.

20. The apparatus of claim 19 wherein the processor is further configured to vary a shape of the at least one indicative element, wherein a larger shape corresponds to a higher level of activity associated with the at least one sub-element, and a smaller shape corresponds to a lower level of activity associated with the at least one sub-element.

21. The apparatus of claim 20 wherein the processor is further configured to vary a color of the at least one indicative element, wherein one color is representative of one level of activity associated with the at least one sub-element, and another color is representative of another level of activity associated with the at least one sub-element.

22. A system comprising:
means for providing at least one central element linked to a core application or service of an apparatus;
means for providing at least one sub-element linked to the at least one central element, the at least one sub-element being linked to an application or service of the core application;
means for providing at least one indicative element related to the at least one sub-element, the at least one indicative element being located adjacent the at least one sub-element on a display and related to a parameter of the application or service linked to the at least one sub-element; and
means for varying at least one attribute of the at least one indicative element in dependence on activity related to the parameter of the application or service linked to the at least one sub-element.

23. The system of claim 22 further comprising means for moving the indicative element around the at least one application element a rate of speed that is related to a level of activity associated with the at least one sub-element.

24. A computer program product embodied in memory of a device comprising:
a computer readable code means embodied therein for causing a computer to provide information related to an application, client or service, the computer readable code means in the computer program product comprising:
computer readable program code means for causing the computer to provide at least one central element linked to a core application or service of the device;
computer readable program code means for causing the computer to provide at least one sub-element linked to the at least one central element, the at least one sub-element being linked to an application or service of the core application;
computer readable program code means for causing the computer to provide at least one indicative element related to the at least one sub-element, the at least one indicative element being located adjacent the at least one sub-element on display of the device and related to a parameter of the application or service linked to the at least one sub-element; and computer readable program code means for causing the computer to vary at least one attribute of the at least one indicative element in dependence on activity related to the parameter of the application or service linked to the at least one sub-element.

25. The computer program product of claim 24 further comprising computer readable program code means for causing a computer to vary at least one attribute of the indicative element relative to a level of activity with respect to the application associated with the application element, wherein the at least one attribute comprises quantity, size, color or movement.

* * * * *